Figure 9:
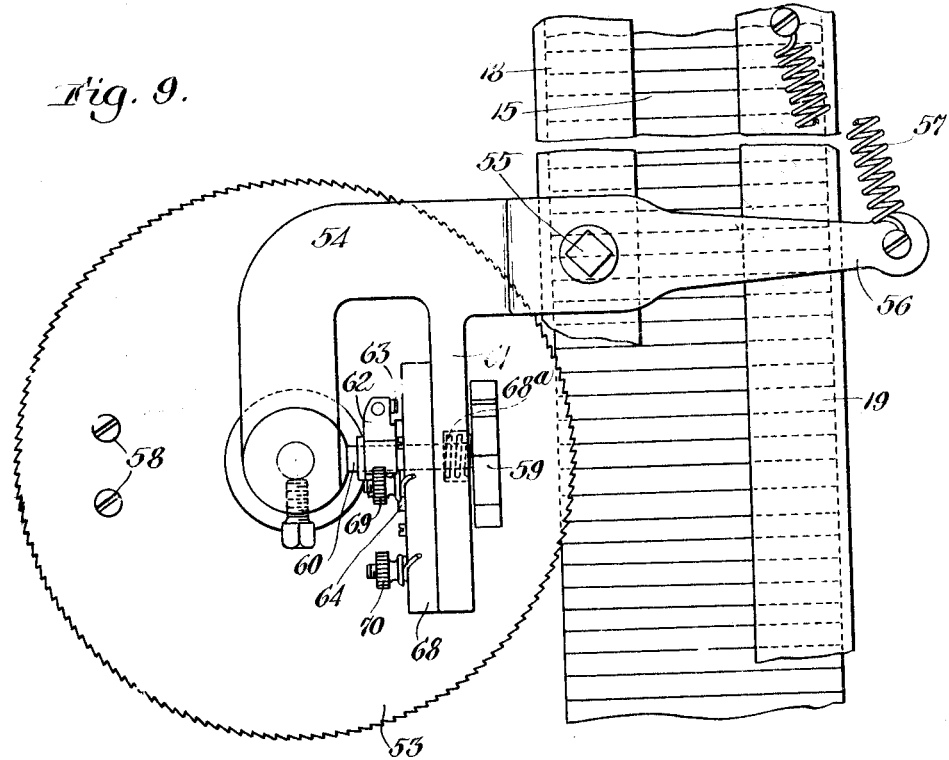

W. P. BOSWORTH.
METHOD OF PRODUCING HEEL LOGS.
APPLICATION FILED APR. 20, 1914.
1,193,756.
Patented Aug. 8, 1916.
4 SHEETS—SHEET 1.
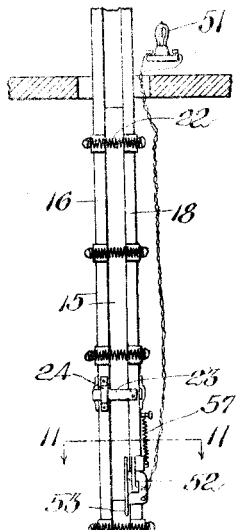
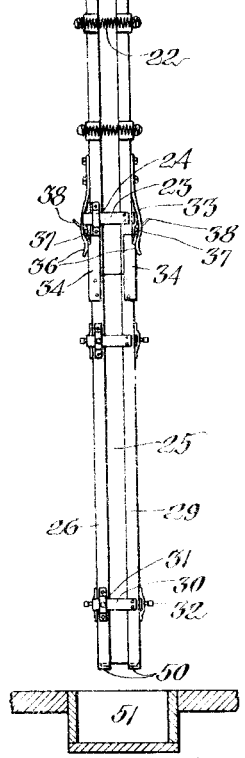
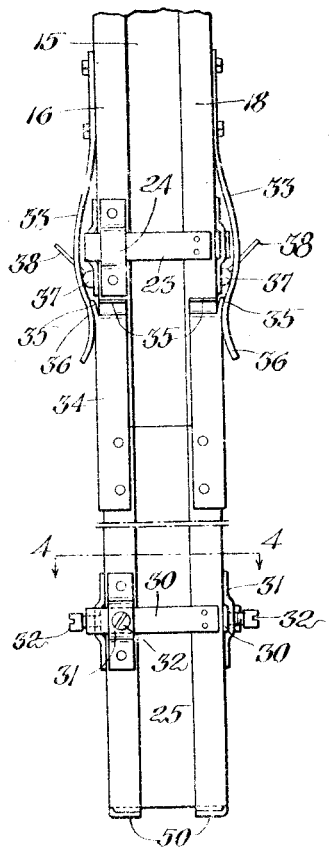
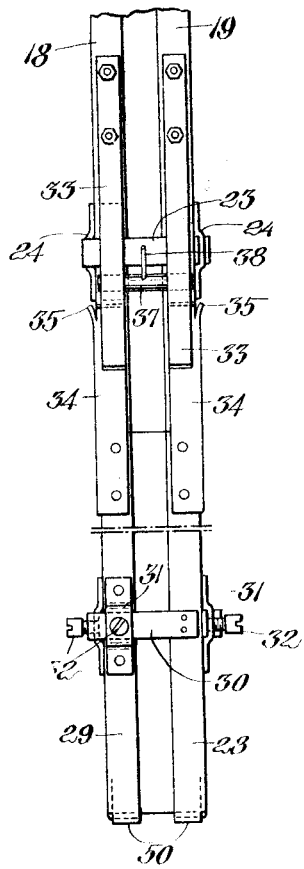
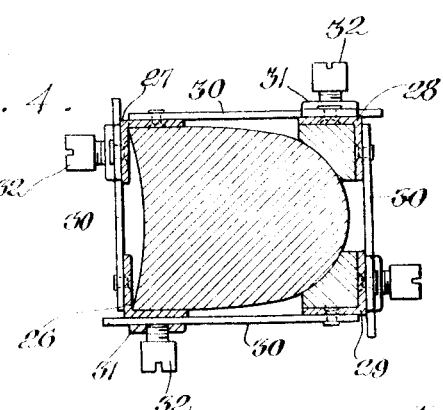

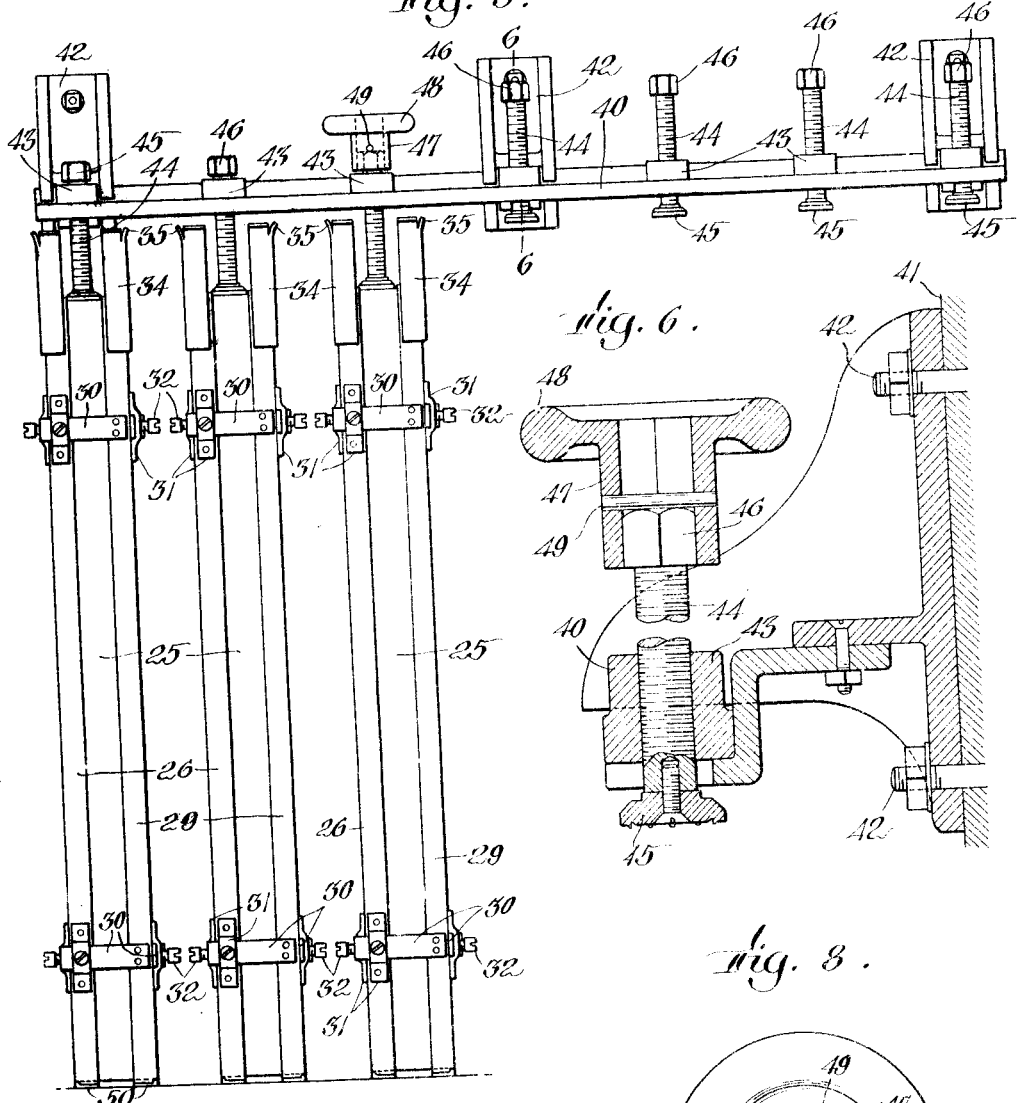

W. P. BOSWORTH.
METHOD OF PRODUCING HEEL LOGS.
APPLICATION FILED APR. 20, 1914.

1,193,756.

Patented Aug. 8, 1916.
4 SHEETS—SHEET 3.

W. P. BOSWORTH.
METHOD OF PRODUCING HEEL LOGS.
APPLICATION FILED APR. 20, 1914.
1,193,756.
Patented Aug. 8, 1916.
4 SHEETS—SHEET 4.
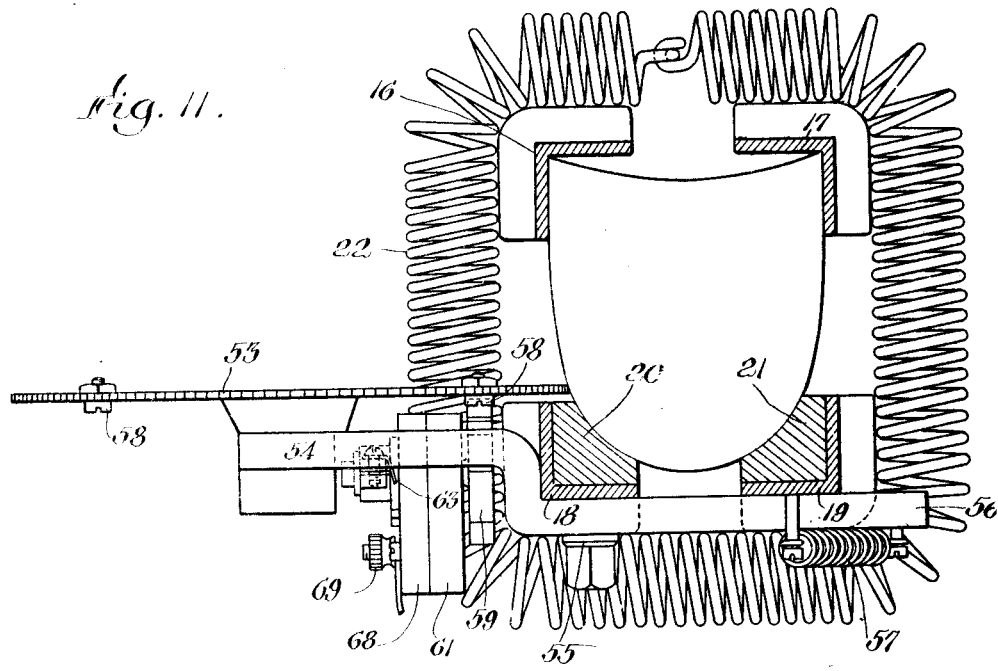
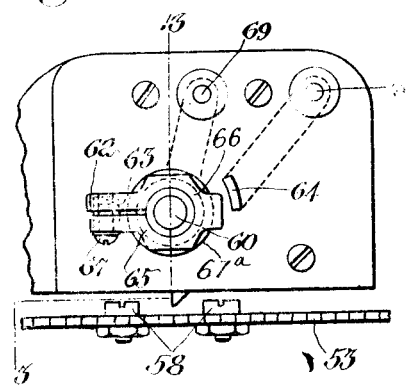
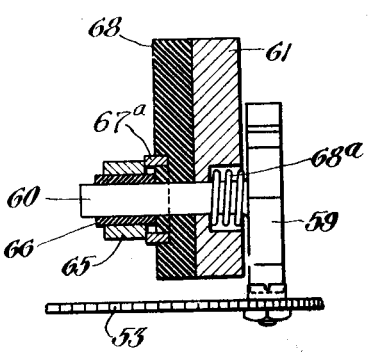

UNITED STATES PATENT OFFICE.

WENDELL P. BOSWORTH, OF BROCKTON, MASSACHUSETTS, ASSIGNOR TO BROCKTON HEEL COMPANY, OF BROCKTON, MASSACHUSETTS, A CORPORATION OF MASSACHUSETTS.

METHOD OF PRODUCING HEEL-LOGS.

1,193,756.

Specification of Letters Patent. Patented Aug. 8, 1916.

Application filed April 20, 1914. Serial No. 833,075.

*To all whom it may concern:*

Be it known that I, WENDELL PHILLIPPS BOSWORTH, a citizen of the United States, and resident of Brockton, in the county of Plymouth and State of Massachusetts, have invented certain new and useful Improvements in Methods of Producing Heel-Logs, of which the following is a specification.

The present invention relates generally to the art represented in my prior Patents No. 936,858 dated October 12, 1909 and No. 1,076,742 dated October 28, 1913, of building heel lifts, either whole or pieced, into so called heel logs. In said prior patents the procedure described is that of progressively placing lifts which have been coated with adhesive, in a pile, and constantly forcing the pile downward through a guide adapted to embrace the pile or column of lifts, by pressures successively applied to each topmost lift after placement of the lift on the top of the pile. In the method or mode of operation described in said patents, all of the lifts or layers are coated with adhesive so as to make a continuous heel log without subdivisions, which log is afterward subdivided by cutting into heel blanks. In the said patents also I have shown guides sufficiently long to enable a slow drying adhesive to set and become firm during the time required for any point in the log to travel from one end to the other of the guide at the rate of travel caused by the mode of operation described.

The present invention has for its object to enable heel log sections of relatively short length to be produced by a continuous operation of the sort described in said patents, and to be further operated on in such manner as may be necessary to produce heels. One of the effects secured is that the guides, even when a slow drying adhesive is used to secure the lifts together may be much shorter than those described in the prior patents, and the sections may be removed from time to time as they emerge from the guide and subjected to pressure in a suitable container for as long a period as may be necessary to enable the adhesive to become thoroughly firm.

In the practice of the present invention the adhesively coated lifts are placed one on top of another in a mold and pushed through the mold and through a guide arranged in continuation of the mold, in a manner similar to that described in the prior patents, but the procedure is varied by the insertion from time to time of non-adhesive lifts or parting layers which are placed at the necessary distance apart from one another in the column so as to divide the pile or column into readily separable sections of predetermined height; each section being composed of lifts which are secured together, and thereby constituting a unit structure, but being distinct from and not connected with any of the other sections.

One feature of the invention comprises the step of inserting parting layers at suitable intervals in the pile of lifts so as to divide the column, which I have called a heel log in analogy to the terminology used in my prior patents, into sections of desired length.

Another feature of the invention comprises the further step of subjecting the separate sections, after they have emerged from the guide, to a sufficiently firm pressure to hold them closely in contact while the adhesive continues to dry or set, this feature being employed in conditions of operation where the adhesive used is of such character as not to become thoroughly dry or set in the time required for a given point in the column or log to pass through the relatively short guide. The second feature named is dependent upon the first, and is therefore claimed in this application as part of a continuous process, but the first feature is not dependent upon the second, and may be employed or practised in conditions which do not require subsequent holding of the log section under pressure after it has been released from the guide.

In definition of the terminology used in the following specification and claims, I will state that the pile or column of lifts in the guide is considered as a heel log, and the sections into which such column is divided by the non-adhering parting layers are considered as heel log sections. The term "heel log" therefore evidently designates a column or pile composed of a plurality of unconnected sections. The term "lifts" is used to designate the layers which are placed one upon another to form the heel log, and which may be made in one piece or of a number of pieces fitted together. Ordinarily the lifts used in this method of operation are what is known as pieced lifts, that is, lifts made of pieces fitted together in the same plane, but it is not a departure from the invention to use whole pieces for the lifts or layers; and it is to be understood that the term "lift" includes integral as well as pieced lifts.

The exact nature of the invention and of the process embodied therein more fully appears from the following detailed description of a specific apparatus employed in the carrying out of my method, and of the mode of procedure followed in connection with the apparatus. Such apparatus is shown in the accompanying drawings, in which—

Figure 10:
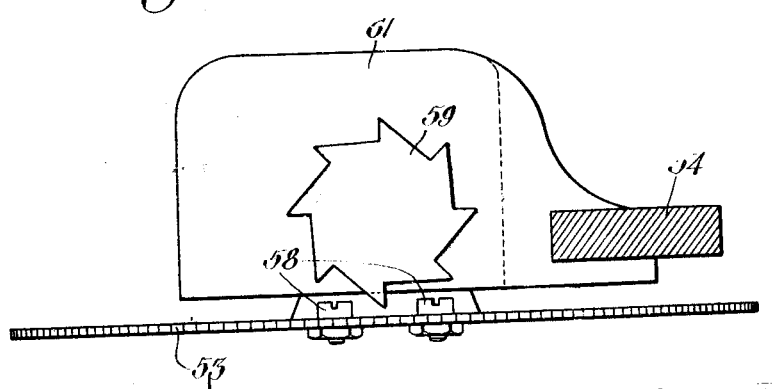

Figure 1 is a side elevation of a combined heel log guide and receptacle, with the accessories thereto, in which my present invention is embodied. Fig. 2 is an enlarged fragmentary view of the guide and receptacle showing the disconnectible joint between the two. Fig. 3 is an elevation of the part shown in Fig. 2 as seen from the right of said figure. Fig. 4 is an enlarged horizontal cross section of the receptacle taken on line 4—4 of Fig. 2. Fig. 5 is an elevation of a means for retaining the log sections in the detachable receptacles under pressure. Fig. 6 is a detail of the pressure applying means, being a vertical section on an enlarged scale taken on line 6—6 of Fig. 5. Fig. 7 is a detail under plan view of the pressure applying means. Fig. 8 is a detail under plan view of a wrench used in connection with the pressure applying means. Fig. 9 is a front elevation on an enlarged scale of a part of the heel log guide and of the measuring device which constitutes a part of the means embodied in my invention for enabling the heel log to be divided into lengths. Fig. 10 is an end view as seen from the right of Fig. 9 of the measuring device. Fig. 11 is a sectional plan view on line 11—11 of Fig. 1 drawn on an enlarged scale. Fig. 12 is a detail elevation of the contact devices as seen from the left of Fig. 9, which form a part of the said means. Fig. 13 is a cross section on line 13—13 of Fig. 12.

The same reference characters indicate the same parts in all the figures.

In the following description I shall describe the embodiment of the invention particularly illustrated in these drawings without thereby intending to limit the scope of the invention strictly to this particular construction.

In the drawings 15 represents a guide open at the upper end, in which heel lifts are piled upon one another after being coated with adhesive, and through which the piled up lifts are forced by pressure applied endwise of the guide to the uppermost lift of the pile, successive lifts becoming attached to those previously forced into the guide to form a heel log. The lifts may be placed on top of the log by hand or in any other desired way and forced through the guide by any suitable and desired means, whether by such means as are shown by my prior Patent No. 936,858, or by other means, the particular means employed for the purpose being immaterial to the present invention. The guide 15 may have any desired form, and in the present illustrated embodiment of the invention is constructed in general similarly to the guide shown in my prior Patent No. 1,076,742. As best shown in Fig. 11, the guide is formed of four corner pieces 16, 17, 18, and 19 of which the two first-named embrace the corners of the heel log and the two last named are provided with cheek pieces 20 and 21, respectively, concaved to bear on the curved part of the log which corresponds to the rear of a heel. The said corner pieces are structurally separate from one another and are resiliently bound together by spring binders 22, which are here represented as helical springs passed around the four corner pieces and joined at their ends in a state of such tension as to cause the corner pieces to bear against the heel log and cause a frictional resistance to the downward movement of the latter in the guide. The corner pieces are kept in proper relation to one another by straps 23 and sockets 24 placed at proper distances apart on the corner pieces. Each corner piece has one strap and one socket, the strap being rigidly connected upon the outer face of the corner piece at one side of the angle thereof, and the socket being similarly connected to the outer face on the other side of the angle. The strap on each corner piece projects transversely across the guide and is received slidingly in the socket of the adjacent corner piece.

At the lower end of the guide and forming a continuation thereof is a receptacle 25, also preferably formed of corner pieces 26, 27, 28 and 29 similar to the corner pieces of the guide 15 and arranged to embrace and engage the heel log in a similar manner. The corner pieces of the receptacle are secured together by straps 30 and sockets 31 of similar nature and similarly arranged to the straps and sockets of the guide, with this difference that the sockets 31 are provided with clamps 32, conveniently set screws, which grip the straps and prevent any lateral movement of one corner piece relatively to another. Thus the parts or elements of the receptacle are not freely movable against resilient resistance but they may be adjusted so as to conform accurately to a heel log of any size within reasonable limits.

The receptacle is detachably connected with the lower end of the guide and is one of several interchangeable receptacles adapted to be so connected with the same guide. In Figs. 2 and 3 I have illustrated a means for making the required detachable connection between the guide and receptacle. The means here shown consists of springs 33 connected in pairs to opposite faces of the guide, such springs being resilient strips each connected rigidly at one end to the guide and projecting from its point of attachment thereto toward the end of the guide. The receptacle has fastened to its upper end angle bars 34, there being one such bar secured to each corner piece of the receptacle on the outside thereof. Such angle bars extend beyond the end of the receptacle and are adapted to slip over the lower end of the guide and to pass under the springs, that is, to pass between the springs and the guide. The angle bars constitute means for making a telescopic slip joint between the receptacle and guide. Their upper ends are provided with outwardly turned lips 35 which pass under and beyond inwardly bowed portions 36 of the springs. Thereby the receptacle can not be removed after once being applied to the guide without the exertion of sufficient force to bend the springs outwardly far enough to permit the outwardly turned lips 35 to pass the inwardly bowed parts 36 of the springs. The lips 35 constitute abutments arranged to be engaged by inwardly offset portions of the springs, which serve as catches.

The form of coupling between the detachable receptacle and the guide is one which I have adopted because it is simple and efficient, but I do not limit the invention to this particular form of coupling, since any form of coupling or connection whatever which permits engagement and detachment of a receptacle having the characteristics of the receptacle here described, with and from the guide, respectively, is within the purview of my invention.

If desirable I may provide positive means for releasing the spring catches in order to permit a more ready disconnection of the receptacle from the guide. A means suitable for this purpose is shown in the drawings and consists of cams 37 interposed between the guide and the springs. The cams are provided with handles 38 by which they can be rotated, and are constructed to extend farther from the guide when in one position than in another position, so that when turned into one position they crowd the springs away from the guide and release the springs from the abutments 35.

The purpose of my improvement being to permit heel logs to be built in guides which are so short that the time required for any given point in the log to pass entirely through it is insufficient to permit the cement or adhesive with which the lifts are bound together to set, it is my purpose in providing the detachable receptacle 25 to enable such receptacle to be removed with a section of a heel log contained therein, and to be set away in a position where it may retain the log section until the cement has hardened, and to enable another receptacle of similar character to be substituted. The catches provided by the lips 35 and the springs 33 permit the desired removal and attachment of receptacles to the guide to be readily made, and they hold the receptacle when attached in alinement with the guide.

When detached the receptacle with its contained heel log section is put aside and the log section is put under compression until the adhesive has set. A means for thus putting the heel log sections in one or more containers under compression is illustrated in Figs. 5, 6, 7, and 8, where 40 represents a bar hung at a sufficient number of points from a wall 41 by means of brackets 42. The bar 40 overhangs a floor or other supporting surface on which the lower ends of the receptacles may be placed high enough to admit such receptacles beneath it. The bar is provided with bosses 43 which are internally threaded and in which are contained screw pushers 44. Each of these pushers is adapted to enter one of the receptacles placed beneath it and to bear on the upper end of the heel log section in such receptacle. The pusher has a foot 45 swiveled on its lower end, as shown in Fig. 6, and has a head 46 at its upper end adapted to be engaged by a wrench.

In Figs. 5, 6, and 8, 47 represents a socket wrench adapted for engagement with the head 46, having a socket at its lower end to fit the head 46 and a rim 48 at its upper end to be grasped by the hand of the operator. A stop 49, here shown as a pin crossing the socket portion of the wrench is provided to limit the distance which the plunger head may penetrate into the socket. A receptacle with its heel log may be placed under any one of the screw plungers and the heel log section therein may be compressed and retained under compression as long as necessary. The compressing means constituted by the plurality of plungers 44 continues the compression of the heel log sections for as long a period as may be needed, thereby obviating the necessity of having the guide sufficiently long to enable the cement to set during the passage of the heel log through it. As many of the compressing plungers 44 may be provided as necessary to ;e care of all the receptacles which are needed in connection with one or more of the guides. Preferably the receptacles are provided with lips 50 or other abutments at their bottoms which are pressed upon by the lower end of the advancing heel log section, and through which continuing advance of the heel log automatically disconnects the receptacle from the guide. When so disconnected the receptacle drops far enough to clear the coupling of the receptacle from the lower end of the guide, whereupon the detached receptacle may be removed and an empty one substituted.

The automatic separation of the filled receptacle with its contained heel log section is an advantageous feature in that it avoids the necessity of constant attention to insure removal of the receptacle at the proper time. Another feature of the invention is the provision of means for dividing the heel log into sections of desired length in order that the section which fills the receptacle may part from the log in the guide readily and automatically, and in order also to avoid the necessity of cutting a long heel log into sections suitable for a slicing or cross-cutting machine, in cases where the log is made and completed in a single guide. To permit of this result parting pieces or layers are interposed at proper intervals between adhesively coated lifts during the process of building up the log. Such parting strips may be pieces of paper impregnated with paraffin, or may be of any other material which will prevent adhesion of the paste or cement with which the lifts are coated. The parting layers may be of any material which in itself is repellent to the adhesive with which the lifts are coated, or is impregnated or coated or otherwise treated so that either or both surfaces are thus repellent to the adhesive, and are not necessarily of the specific material, paraffined paper, above named. This feature of the invention is embodied in any parting layer which is of such a character that the adhesive will not stick to it, and the terms "non-adhesive" and "repellent to adhesive" used in the claims to characterize the parting layers are intended to mean that the parting layers have such quality, either intrinsically or by appropriate treatment, that the adhesive will not adhere to them. In the mode in which I now work my invention, the parting strips or layers are inserted by the operator by hand upon the lift which forms the upper end of one section and before placing the next lift, but I contemplate using automatic means for placing the parting layers; and to use automatic means for this purpose would not be a departure from my invention.

In this application I have illustrated a means for informing the operator when it is time to insert a parting layer, and this means, or an equivalent, may be adapted for operating or controlling an automatic apparatus for inserting parting layers, as well as for guiding the actions of the operator to the same end. The means here illustrated consists of a signal 51 represented as an electric light, and a signal operating means 52 controlled by the travel of the heel log. The signal operating means is illustrated in detail in Figs. 9 to 13. It includes a wheel 53 mounted in a bracket 54 which is pivoted at 55 to one of the members of the guide and is provided with an arm 56 upon which a spring 57 acts to press the periphery of the wheel against the surface of the heel log. If desired the circumference of the wheel may be serrated or otherwise roughened to avoid liability of slipping. The wheel carries pins or studs 58 of which there may be any suitable number, which studs act on the teeth of a star wheel 59. Said star wheel has a shaft 60 which is rotatably mounted in an arm 61 of the bracket 54. The star wheel is thus rotated intermittently as desired at a rate in proportion to the rate of rotation of the wheel 53, depending on the number of the studs 58 and the number of teeth of the star wheel. In the present embodiment of the invention the star wheel 59 is rotated completely once while the wheel 53 rotates twice during which time the heel log is fed three feet. Obviously, however, any other speed ratios may be adopted within the scope of the invention.

The shaft of the star wheel carries an arm 62 having a contact member 63, forming one part of a switch, the other part of which is formed by a contact member 64. These members are in circuit with the signal 51, and when connected they complete the circuit and operate the signal. For details of the contact members and their electrical and mechanical connections, reference is directed to Figs. 12 and 13. The arm 62 projects from a collar 65 which surrounds a washer 66 of non-conducting material fitting the star wheel shaft 60. Arm 62 is split as far inward as the interior of the collar and is provided with a screw 67 which clamps the collar on the washer 66. The collar is held in contact with a metallic ring 67ª by means of a spring 68ª which surrounds the shaft 60 in a socket in one side of the bracket arm 61 and presses outwardly on the star wheel 59. Ring 67ª is embedded in a plate 68 of insulating material attached to the front of the arm 61. The insulation 66 and 68 isolates the contact member 63 electrically from the shaft 60 and from all other parts of the apparatus except the ring 67 and the contact piece 64. Said ring and contact piece are connected with binding posts 69 and 70, respectively, whereto the wires of the signal 51 are also connected. It is to be understood of course that the electric circuit also includes a source of electrical energy, which I have not deemed it necessary to illustrate.

It will be understood from the foregoing description that the apparatus in connection with which my present invention is carried out includes a guide within which a heel log may be formed, which is insufficient in length to enable the adhesive applied to the lifts to dry during the traverse of the log through it; a plurality of end portions or receptacles, each adapted to receive sections of the heel log and to retain such sections for a long enough time to permit the adhesive to dry when the adhesive is of such a character as not to have dried during the traverse through the guide; means for enabling separating or parting layers to be inserted in the heel log at intervals corresponding to the length of the detachable receptacles; and a means for compressing the heel log sections in the receptacles while the adhesive is drying. The present invention is independent of any particular mechanism or means for assembling the lifts into the form of the log and for pressing the lifts through the guide, but may be used in connection with any mechanism or means suitable for the purpose.

While the step of inserting parting layers in the log during building, and the idea of means for inserting such parting layers or for governing the location of such layers are parts respectively of the combinations involving the complete method and the complete apparatus hereinbefore described, yet the idea of dividing the heel log by parting layers inserted during the course of manufacture is capable of use also in cases where the log is otherwise built up, for example, in the manner described in my prior patents, in a guide long enough to retain the log until the adhesive has become set. Accordingly I wish it to be understood that this last feature of my invention, that is the feature of placing the parting layers in the log, is not limited solely to the combination including means for confining a section of the log separate from the guide. When the idea of separating the log into sections by parting layers is employed in connection with a guide which is long enough to allow the adhesive to set in the time required for any given point in the log to traverse the entire guide, the separation or division so effected causes heel log sections of a predetermined convenient length, for instance three feet more or less, to be furnished without requiring such sections to be cut by a separate operation from a heel log of indeterminate length. The heel log sections produced in the manner described in this specification and in my prior patents are subsequently cut up by a slicing or a cross-cutting machine into heel blanks in cases where the sections are longer than the height of a single heel blank. It is not an essential feature of the present invention, however, that the section should be longer than the amount indicated, for it is part of my contemplation to place parting layers with such frequency that each section of the log is a single heel blank, requiring no further subdivision to put it in condition for being made into a heel ready for application to a shoe. From the standpoint of economy, however, I consider that it is preferable to make the sections of a length approximating three feet and to form heel blanks by subsequently slicing the section, but the invention is in nowise restricted to producing log sections of any particular length or height, or to the step of subsequently dividing it into blanks. However, when the sections are longer than the height of an individual heel, the mode of dividing the log into sections, as hereinbefore described, furnishes heel log sections of convenient length to be operated upon by such a cross cutting machine, and furnishes them in such a condition that they can be taken when required. That is, the apparatus employed automatically delivers heel log sections of convenient length without requiring the attendance of any operator to cut off such sections from a log of greater length before feeding the sections to the cross cutting machine.

What I claim and desire to secure by Letters Patent is:

1. The method of building heel log sections which consists in placing lifts coated with an adhesive one upon another, applying pressure from time to time to the endmost lift of the accumulation with sufficient force to propel such accumulation endwise against yielding resistance, placing parting layers which are repellent to adhesive at suitable intervals between adjacent superposed lifts to divide the log formed thereby into readily separable sections, removing such sections from time to time, and maintaining the sections under endwise pressure after they have been removed from the log while the adhesive becomes set.

2. The method of producing heel log sections which consists in piling lifts coated with an adhesive upon one another, applying pressure from time to time to the lift last placed and at the same time feeding the accumulation of lifts endwise, and placing parting layers which are repellent to adhesive from time to time between two adjacent lifts.

3. The method of producing heel log sections which consists in placing lifts coated with an adhesive one on top of another in a pile, applying pressure longitudinally to the pile after placing each lift thereon, placing paste-repellent parting layers between adhesive lifts at intervals, removing the sections of the pile of lifts between adjacent parting layers, and confining such sections under endwise pressure.

4. The method of producing heel log sections which consists in coating lifts with an adhesive and assembling such lifts one upon another in a log, applying pressure endwise of the log upon each lift so assembled, and placing at given points in such column layers which are repellent to the adhesive with which the lifts are coated, whereby the log is divided at the points of placement of such layers into sections, the length of such sections being determined by the distance between the layers in the log.

5. The method of producing unit assemblages of heel lifts by a continuous operation which consists in coating lifts with an adhesive and placing them one upon another in a pile, applying pressure lengthwise of the pile upon each lift last so placed and propelling the pile by such pressure against yielding resistance, placing upon the pile from time to time a layer having a surface repellent to the adhesive with which the lifts are coated, and continuing to place successive lifts bearing an adhesive coating on the pile, and to apply pressure thereto.

6. The method of assembling heel lifts into separate unit bodies in a continuous operation which consists in placing one upon another lifts coated with an adhesive, applying pressure from time to time to the last lift so placed, placing on top of the assemblage so formed a parting layer having a paste-repellent surface, further assembling on such parting layer a number of lifts coated with adhesive, applying pressure from time to time upon the lifts so applied, and continuing to place paste-repellent layers in alternation with numbers of lifts coated with adhesive and to apply pressure from time to time upon the last placed lift.

7. The method of producing unit assemblages of heel lifts, which consists in building up lifts, coated with adhesive, one against another in a log, placing parting layers which are repellent to the adhesive at desired intervals in the log, applying pressure from time to time to the lift last placed on the log and thereby feeding the log endwise, and allowing the sections between parting layers to fall away from the end of the log.

8. The method of producing unit assemblages of heel lifts, which consists in building up lifts, coated with adhesive, one against another in a log, placing parting layers which are repellent to the adhesive at desired intervals in the log, applying pressure from time to time to the lift last placed on the log and thereby feeding the log endwise, opposing a yielding resistance against such movement of the log powerful enough to cause the lifts to be pressed firmly together, and allowing the sections between parting layers to fall away from the end of the log.

In testimony whereof I have affixed my signature, in presence of two witnesses.

WENDELL P. BOSWORTH.

Witnesses:
 ARTHUR H. BROWN,
 P. W. PEZZETTI.